UNITED STATES PATENT OFFICE.

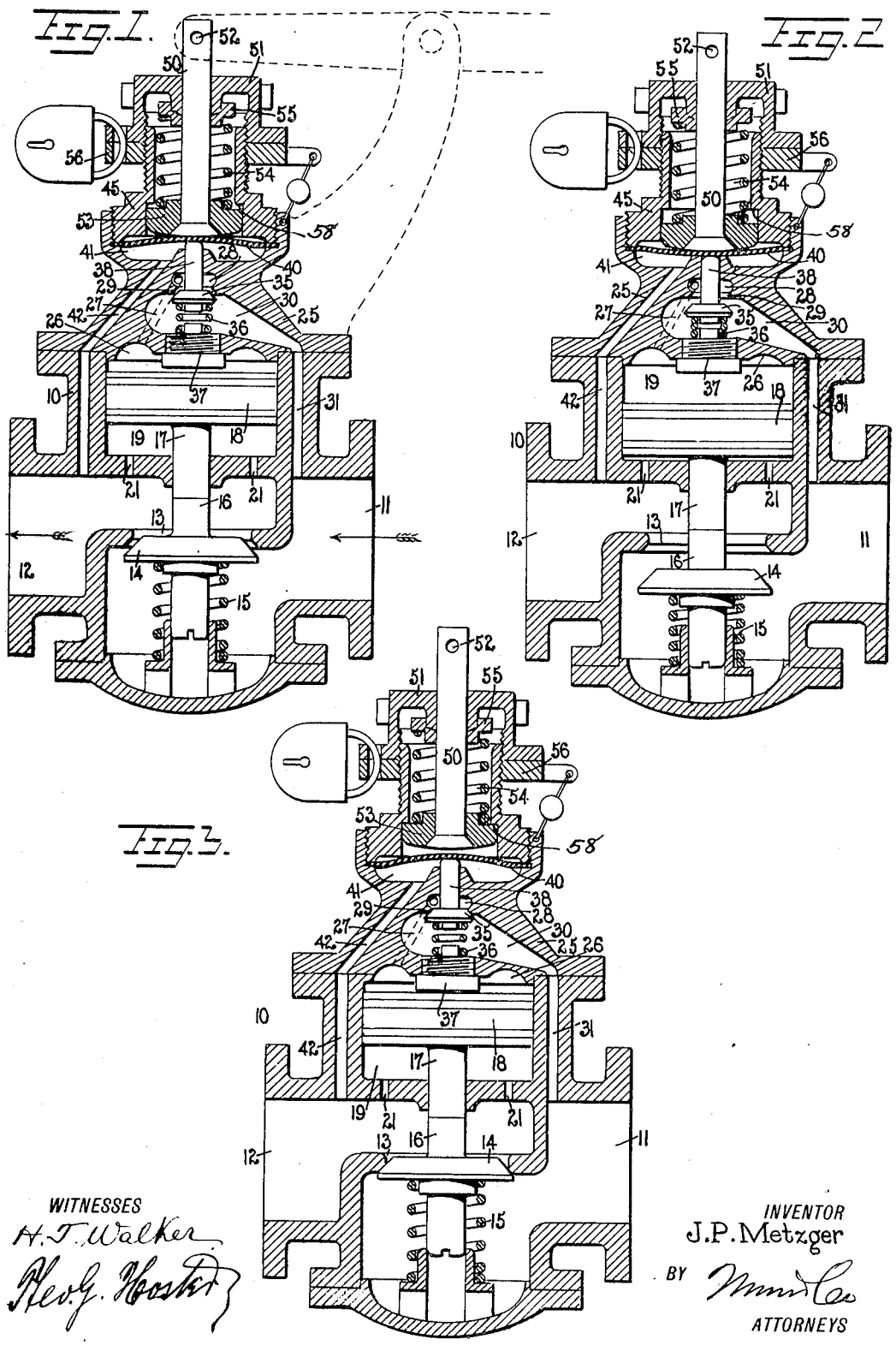

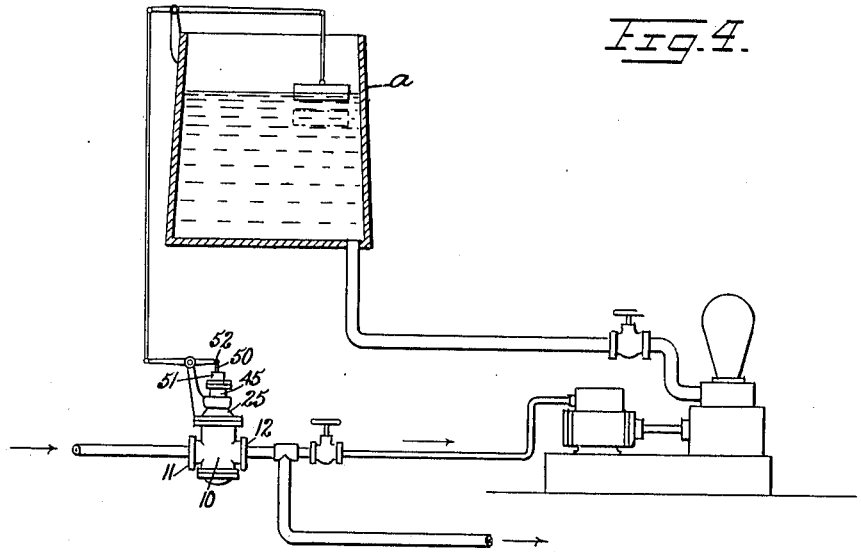
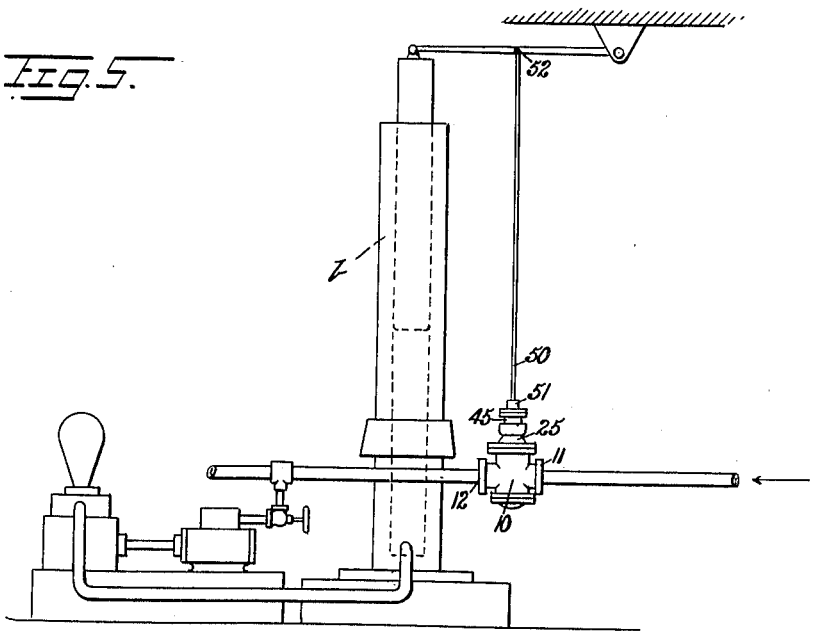

JULES P. METZGER, OF CARLSTADT, NEW JERSEY, ASSIGNOR TO THE LESLIE CO., OF LYNDHURST, NEW JERSEY.

PRESSURE-REGULATOR.

1,308,638.  Specification of Letters Patent.  Patented July 1, 1919.

Application filed June 18, 1917. Serial No. 175,407.

*To all whom it may concern:*

Be it known that I, JULES P. METZGER, a citizen of the United States, and a resident of Carlstadt, in the county of Bergen and State of New Jersey, have invented a new and Improved Pressure-Regulator, of which the following is a full, clear, and exact description.

The invention relates to fluid pressure regulators in which a diaphragm controls the action of the main valve, the diaphragm being pressed on at one side by a spring device and at the other by fluid pressure so that the high pressure fluid passing through the regulator is discharged from the latter to a predetermined lower pressure. This type of pressure regulator is generally used in an apparatus requiring an accurate functioning under a practically constant pressure involving very little movement of the parts, and after the pressure regulator is set to the predetermined pressure it is locked or sealed or both to prevent the operator in charge from tampering with the pressure regulator. A pressure regulator of this type is shown and described in Letters Patent of the United States, No. 1,244,226, Oct. 23, 1917.

The object of the present invention is to provide certain new and useful improvements in pressure regulators whereby the usual functions of the pressure regulators are maintained and in addition the pressure regulator can be readily used as a full open valve, a shut-off valve, an emergency device under the control of an authorized person, or a variable adjusting governing valve for connection with a float valve, pump governor, intensifier or the like.

In order to accomplish the desired result, use is made of a spring actuated valve having a stem projecting upward therefrom, a diaphragm engaging and controlling said stem, a set spring means contacting with said diaphragm opposite the said valve stem, said set spring means including a continuous stem projecting upwardly and through the regulator body to the outside thereof, and means on the outer portion of the said continuous stem to permit of lifting or depressing the same.

A practical embodiment of the invention is represented in the accompanying drawings forming a part of this specification, in which similar characters of reference indicate corresponding parts in all the views.

Figure 1 is a sectional side elevation of a pressure regulator provided with the adjusting device in position, with the pilot valve and the main valve slightly open;

Fig. 2 is a similar view of the same with the regulator in full open position;

Fig. 3 is a similar view of the same, with the regulator shut off entirely and the diaphragm released from any downward pressure whatever and irrespective of the pressure at which the regulator was originally set;

Fig. 4 is a side view of the regulator showing it applied to a float valve; and Fig. 5 is a similar view showing it applied to an intensifier.

The body 10 of the pressure regulator illustrated in the drawings is provided with an inlet 11 connected with a boiler or other source of motive agent supply, and the body is provided with an outlet 12 for supplying steam or other motive agent to the machine to be driven. A valve seat 13 within the body 10 connects the inlet 11 with the outlet 12 and this valve seat 13 is controlled by a valve 14 normally held to its seat by a light spring 15. The upper end of the stem 16 of the valve 14 is connected with the stem 17 of a piston 18 mounted to reciprocate in a cylinder 19 formed within the body 10 and separated from the outlet 12 by a horizontal partition 20 having openings or ports 21 to connect the lower end of the cylinder 19 with the outlet 12. The upper end of the cylinder 19 is closed by a cap 25 provided at the under side with a recess 26 connected by one or more ports 27 with a chamber 28 arranged in the cap 25. The chamber 28 is provided at the under side with a valve seat 29 opening into an expansion chamber 30 formed in the cap 25 and connected by a port 31 with the inlet 11. The valve seat 29 is normally closed by a controlling valve 35 extending within the expansion chamber 30 and pressed to its seat by a spring 36 seated on the top of a screw plug 37 screwing in the bottom of the expansion chamber 30. The upwardly extending stem 38 of the controlling valve 35 is engaged at its upper end by a diaphragm 40 held in a diaphragm chamber 41 arranged in the top of the cap 25 and connected by a port or opening 42 with the outlet 12. The diaphragm 40 is fastened in position by a nipple 45 screwed or otherwise secured to the top of the cap 25. The construction thus far disclosed involves no new features.

The top of the diaphragm 40 is normally pressed on by the lower end of a rod or stem 50 extending centrally in the nipple 45 and passing through a cap 51 screwed or otherwise secured to the nipple 45. The rod or stem 50 projects a distance above the top of the cap 51 and is provided at its outer portion with an aperture, pin or other suitable means 52 adapted to connect with various devices for lifting the rod or stem 50 or for depressing the same as the case may be, and as hereinafter more fully explained. The lower end of the rod or stem 50 is provided with a head or enlargement 53 on which rests the lower end of a spring 54 extending within the nipple 45 and engaging a seat 55 swiveled on the under side of the cap 51. By screwing the cap 51 down or up on the nipple 45 the tension of the spring 54 can be regulated and after the desired adjustment is made the cap 51 is locked and sealed by suitable locking and sealing means such as a nut lock 56, for instance, as shown in the drawings.

Normally the set spring device, composed of the rod or stem 50, its head or enlargement 53, the spring 54 and the cap 51, bears on the top of the diaphragm 40 and hence the latter is alive, lively and resilient at all times. When it is desired to provide a full flow of the fluid through the pressure regulator then a desired pressure is exerted on the outer end of the rod or stem 50 whereby a downward pressure is exerted on the diaphragm 40 which latter moves the valve 35 into the full open position, as plainly shown in Fig. 2. It is understood that a downward pressure of the valve 35 is opposed by the spring 36 thereof and the outlet pressure exerted against the under side of the diaphragm 40 from the outlet 12. When the regulator is to be used as a shut-off or emergency valve then an upward pull is exerted on the outer end of the rod 50 to lift the latter clear of the diaphragm 40 and against the tension of the spring 54. The diaphragm is thus entirely released and rests on the center of the pilot valve 35 but with no action whatever either above or below. The upward movement of the rod or stem 50 is limited by a shoulder 58 formed within the nipple 45 and adapted to be engaged by the head or enlargement 53 of the rod or stem 50. It is understood that as soon as the stem 50 is released it immediately returns to active position by the action of its spring 54, that is, its lower end reëngages the diaphragm 40.

It will be noticed that by the arrangement described the pressure regulator can be readily set to any desired predetermined pressure by adjusting the cap 51, and hence the tension of the spring 54 so that the rod or stem 50 bears with a desired pressure on the upper side of the diaphragm 40. The tension device is then locked or sealed by the lock 56 and the pressure regulator now functions automatically under the set or predetermined pressure. When an increased pressure is desired then the outer end of the rod or stem 50 is pressed correspondingly inward to augment the pressure of the set spring device on the diaphragm 40 and hence the latter is pressed downward and the controlling valve 25 is more fully opened thus allowing a full flow of the steam to pass from the inlet 11 by way of the passage 31, chamber 30, valve seat 29, chamber 28 and port 27 into the upper end of the cylinder 19 whereby the piston 18 is forced downward and with it the valve 14 to move the latter fully open and thus increase the flow of the steam from the inlet 11 to the outlet 12 by way of the valve seat 13.

It will be noticed that this result is obtained without resorting to any adjustment of the locking and sealing means and as soon as the pressure on the outer end of the rod or stem 50 is released the parts return to their normal position and the pressure regulator again functions under the normal predetermined pressure to which it is originally set.

When it is desired to completely shut the valve 14 then the outer end of the valve rod or stem 50 is lifted (see Fig. 3) to completely disengage the lower end of the rod or stem 50 from the diaphragm 40. The control valve 35 now closes by the action of its spring 36 and hence steam is cut off from the upper end of the cylinder 19 and the steam passing from the outlet 12 by way of the ports 21 into the lower end of the cylinder 19 raises the piston 18 thus moving the valve 14 into closed position on its valve seat 13. The inlet 11 is now completely cut off from the outlet 12. As soon as the upward pressure on the rod or stem 50 is released the parts return to their normal position and the pressure regulator again functions under the normal predetermined pressure to which it is originally set. It will be noticed that the outer end of the rod or stem 50 may be held in the depressed or raised position above mentioned for any desired length of time from instantaneous to continuous service, and as soon as the outer end of the stem is released the pressure regulator again functions under the normal predetermined pressure to which it is originally set.

From the foregoing it will be seen that the automatic pressure regulator is capable of being set to any pressure desired, that for any desired time it may be used as a full open valve without interference with its return to the function of an automatic pressure regulator, or it may be used as a shut off valve without interfering with its release to revert to function as an automatic reducing valve, or it may be used as a variable adjustable governing valve as applied from any outside source, for instance, in connection with a float valve *a*, as shown in Fig. 4, pump governor, intensifier *b*, as shown in Fig. 5, and the like device, by means of which the independent means of returning the regulator to the special conditions can be obtained by a suitable connection between them. It will be noticed that the means for producing these results or any one of them may be applied at the regulator proper or from any distant point.

Many occasions and conditions arise in which it is necessary to use several regulating valves to produce certain results, sometimes, for instance, a high pressure pump with a given delivery pressure, and working intermittently in connection with another auxiliary having a different pressure and volume required; with my improvement one device only will be necessary. There are many similar cases in which regulating devices control different apparatus, for instance, a main steam line feeds several branches; with my improvement a great saving in installation can be effected in the number of fittings, devices and even pipe lines.

In many other cases, my improvement is of great worth in view of the fact that it can instantly be used from an automatic device into a shut-off valve, either at the valve proper or from some distant point, in order to shut off the fluid pressure and instantly return to its function of automatic reducing valve. Again, in some cases it can be turned into an emergency device under the control of the proper person, and a variation of pressure or volume to any desired amount, from "shut-off valve" to "full open valve" can be secured, and in an instant the device can revert to its function of automatic pressure regulator at the pressure at which it was originally set, and this can be accomplished from any point at or at a distance from the regulator.

My improvement allows the simplest means of producing these results, and while simple, perfect in effectiveness, with no liability of getting out of order, the functional working parts being absolutely protected from being tampered with.

It will be noted that my improvement is shown adapted to pressure regulators of the piston type in which a diaphragm is acted upon by a setting device, the diaphragm, in turn, acting upon a pilot valve, but it is, of course, applicable to any regulator acting directly through a diaphragm where the diaphragm controls a valve.

It will be seen that with my improvement, the functional results are obtained with a few parts, all coördinating to achieve these results in the simplest possible manner, and no parts, in changing from one function to another, are liable to get out of order. The diaphragm 40 itself is protected from distortion buckles, should accidental leakage occur when the device is used as a shut-off valve or from lifting more than the clearance space. All the internal parts are free and axially true and perfectly guided and capable of working smoothly up and down with the diaphragm, the latter absolutely free from any forces tending to affect its resiliency and flexibility, as it stands, so to speak, floating free at its center between two points of contact.

The device may be made to depart from the above construction but not from the spirit of the invention, viz: An automatic pressure regulating device capable of being changed into the different regulating of emergency stop valve, etc., and reverting to its original function by merely lifting or releasing one of its members, and still not change the original setting of the device.

Having thus described my invention, I claim as new and desire to secure by Letters Patent:

1. In a locked or sealed pressure regulator, a casing, a diaphragm therein, a main valve, a spring-pressed valve for regulating the main valve having an upwardly extending valve stem engaging the lower face of the said diaphragm, a rod having at its inner end a head contacting with the upper face of the diaphragm, the upper end of the said rod projecting through the top of the casing to the outside of the regulator, a spring within the casing and bearing on the said rod head, and means connected with the projecting end of said rod for operating it.

2. In a locked or sealed pressure regulator, a casing, a diaphragm therein, a spring pressed valve having an upwardly extending valve stem engaging the lower face of the said diaphragm, a rod having an enlargement at its lower inner end, a head through which the said enlarged lower end of the rod axially projects, said head and the lower end of the rod contacting with the upper face of the diaphragm in line with the axis of the said valve stem, the upper end of the said rod projecting through the top of the casing to the outside of the regulator, a coil spring within the casing bearing downwardly upon the said head, and means connected with the externally projected end of the said rod for raising and lowering the same.

3. In a locked or sealed pressure regulator, a casing having a main fluid channel, a main operating valve controlling the passage of fluid through said channel, a diaphragm within the casing, a spring pressed valve controlling the movement of the main operating valve and having a stem engaging the lower face of the diaphragm, a rod having a head at its lower end engaging the upper face of the diaphragm in line with the axis of said valve stem, the upper end of the said rod projecting through the top of the casing to the outside of the regulator, a spring within the casing bearing downwardly upon the head at the lower end of the rod, and means engaging the upper end of the rod outside of the casing for raising and lowering the same.

JULES P. METZER.

Copies of this patent may be obtained for five cents each, by addressing the "Commissioner of Patents, Washington, D. C."